(12) United States Patent
Stoneback et al.

(10) Patent No.: US 7,195,257 B2
(45) Date of Patent: Mar. 27, 2007

(54) CARGO CART SYSTEM INCORPORATING A PORTABLE CONTAINER CRADLE

(75) Inventors: Virginia Lynn Stoneback, Pinconning, MI (US); Jeffry R. Frahm, Frankenmuth, MI (US)

(73) Assignee: Magline, Inc, Pinconning, MI (US)

( * ) Notice: Subject to any disclaimer, the term of this patent is extended or adjusted under 35 U.S.C. 154(b) by 125 days.

(21) Appl. No.: 11/018,675

(22) Filed: Dec. 21, 2004

(65) Prior Publication Data

US 2006/0131825 A1 Jun. 22, 2006

(51) Int. Cl.
*B62B 3/02* (2006.01)
(52) U.S. Cl. .................. 280/79.6; 280/47.18; 280/280; 280/47.27
(58) Field of Classification Search ............... 280/79.5, 280/79.6, 79.3, 47.18, 47.27, 43.1, 47.31, 280/47.15, 47.17, 47.131, 47.2, 47.21, 47.23, 280/47.24, 47.26
See application file for complete search history.

(56) References Cited

U.S. PATENT DOCUMENTS

| | | | |
|---|---|---|---|
| 921,855 A * | 5/1909 | Loskamp ................. 211/85.22 |
| 1,103,689 A * | 7/1914 | Russell ..................... 280/79.5 |
| 2,763,383 A * | 9/1956 | McCoy ....................... 414/542 |
| 3,019,916 A * | 2/1962 | Malcher ..................... 206/596 |
| 5,228,716 A * | 7/1993 | Dahl ........................... 280/651 |
| 5,480,191 A * | 1/1996 | Litin et al. .................. 280/831 |
| 5,527,052 A * | 6/1996 | Litin ....................... 280/47.26 |
| 5,704,625 A * | 1/1998 | Presnell et al. ............ 280/79.2 |
| 5,806,868 A * | 9/1998 | Collins ...................... 280/79.6 |
| 5,913,527 A * | 6/1999 | Hailston .................. 280/47.28 |
| 6,189,720 B1 * | 2/2001 | Gillispie ..................... 220/571 |
| 6,302,414 B1 * | 10/2001 | Berthiaume et al. ..... 280/47.18 |
| 7,117,994 B2 * | 10/2006 | Gratz ......................... 206/446 |

\* cited by examiner

*Primary Examiner*—Christopher P. Ellis
*Assistant Examiner*—Bridget Avery
(74) *Attorney, Agent, or Firm*—Reising, Ethington, Barnes, Kisselle, PC

(57) ABSTRACT

A cargo cart system with a cradle assembly includes a pair of support rails with generally sinuous upper and lower surfaces and at least one cross bar spanning the support rails. The sinuous upper and lower surfaces are maintained in mirrored relation with one another to define pairs of laterally spaced upper and lower support surfaces to support containers in a stabilized position. A method of assembling and retaining containers includes providing a plurality of the cradle assemblies; placing a first cradle assembly on the cart; placing a first row of containers upon the first cradle assembly; placing a second cradle assembly over the first row of containers; and, placing a second row of containers upon the second cradle assembly.

11 Claims, 4 Drawing Sheets

CARGO CART SYSTEM INCORPORATING A PORTABLE CONTAINER CRADLE

BACKGROUND OF THE INVENTION

1. Field of the Invention

This invention relates generally to wheeled push carts, and more particularly to those adapted for transporting cylindrical containers.

2. Related Art

Beverages, such as drinking water and beer are commonly sold in large glass, plastic, or keg-type containers having volume capacities of about 5 gallons or more. As a result, the containers are relatively heavy and bulky, thereby making it difficult to carry the containers. As such, delivery persons typically use assistance devices, such as hand trucks and other types of carts to transport these containers. Unfortunately, even with the assistance devices, the containers can prove difficult to transport. In particular, the containers can roll or move about on a deck of the transport device, thereby causing the delivery person to make provisions, while transporting the containers, to prevent the containers from falling off the deck.

In U.S. Pat. No. 6,302,414, which is assigned to the present applicants' assignee, Magline, Inc., of Pinconning, Mich., a tray is disclosed for use with convertible hand trucks to facilitate transporting cylindrical containers. To enable multiple layers or stacks of containers to be transported, the tray is used in combination with an end support assembly. The end support assembly serves as an end wall opposite an upright handle of the convertible hand truck to abut containers at the ends of alternating stacked rows to maintain the containers in stacked relation relative to one another.

SUMMARY OF THE INVENTION

One aspect of the invention provides a cradle assembly for use with a wheeled cart to facilitate transporting multiple cylindrical containers. The cradle assembly has a pair of support rails with generally sinuous upper and lower surfaces and at least one cross bar attached to the support rails to maintain them in generally parallel relation with one another. The sinuous upper and lower surfaces are maintained in mirrored or vertically aligned relation with one another to define pairs of laterally spaced, upper and lower support surfaces, respectively, for abutting relative containers to carry the containers in a stabilized position.

Another aspect of the invention provides a method of assembling and supporting generally cylindrical containers on a wheeled cart. The method includes providing a plurality of cradle assemblies each having a pair of support rails with generally sinuous upper and lower surfaces with at least one cross bar attached to the support rails to maintain them in generally parallel relation with one another and in mirrored relation with one another to define pairs of laterally spaced, upper and lower support surfaces; placing a first cradle assembly on the cart with the lower support surface of the first cradle assembly resting on a portion of the cart; placing a corresponding number of the containers in abutment with the upper support surfaces of the first cradle assembly; placing a second cradle assembly over the containers resting on the first cradle assembly with the upper support surface of the second cradle assembly facing downwardly for abutment with the containers resting on the first cradle assembly; and, placing a corresponding number of the containers in abutment with the lower support surfaces of the second cradle assembly so that the second cradle assembly is sandwiched between the underlying first row of containers and the overlying second row of containers.

Some potential objects, features and advantages that may be achieved by at least some of the presently preferred embodiments of this invention include providing a cradle assembly that is readily attachable and detachable from a wheeled cart to facilitate transporting multiple rows of generally cylindrical containers, is stackable between an underlying and overlying row of containers to maintain the containers in a stable position, maximizes the number of generally cylindrical containers carried on a wheeled cart at one time, is durable, is easy to use, is of relatively simple design, is economical in manufacture and assembly, and in service has a long useful life.

BRIEF DESCRIPTION OF THE DRAWINGS

Some of the objects, features and advantages of this invention will become apparent in view of the following detailed description of the presently preferred embodiments and best mode, appended claims and accompanying drawings, in which:

DETAILED DESCRIPTION OF THE PREFERRED EMBODIMENTS

Figure 1:
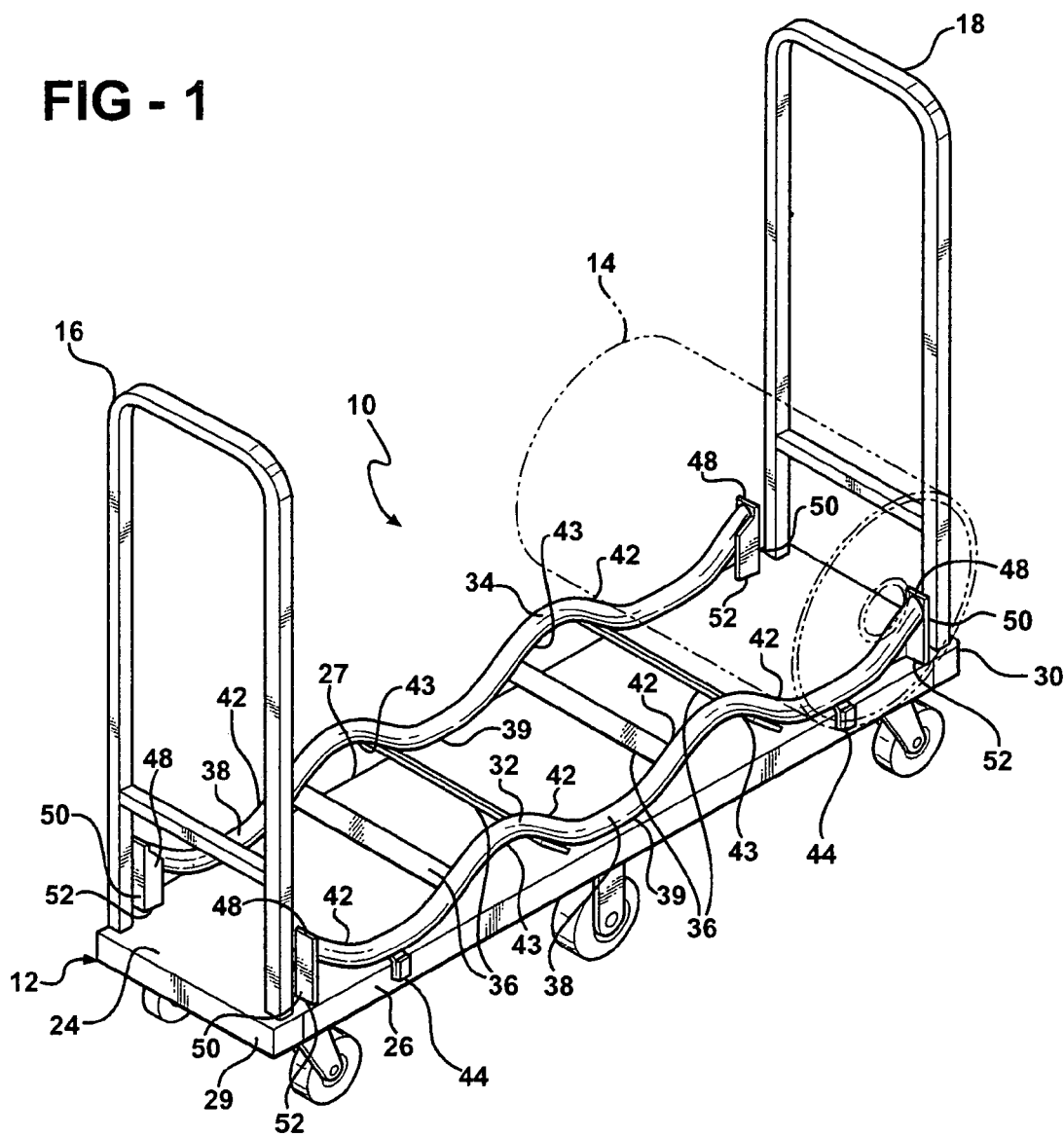
FIG. 1 is a perspective view of a wheeled cart having a pair of upstanding handles at opposite ends of the cart with a cradle assembly constructed according to one presently preferred embodiment removably placed on the cart to facilitate transporting generally cylindrical containers.

Referring in more detail to the drawings, FIG. 1 illustrates a vertically reversible cradle assembly 10 constructed for use with a wheel supported push cart 12 to facilitate transporting vertically supported rows of generally cylindrical containers 14 on the cart 12. A single cradle assembly 10 can be used to carry the containers 14 in a pyramid arrangement, or, in stacked rows, with alternating rows having the same numbers of containers 14, and with outermost containers being maintained at least in part by the handles 16, 18. Otherwise, where the cart 12 has a single upstanding handle 16 (FIG. 5), multiple cradle assemblies 10 can be used to maximize the number of containers 14 capable of being transported on the cart 12 at one time.

Figure 3:
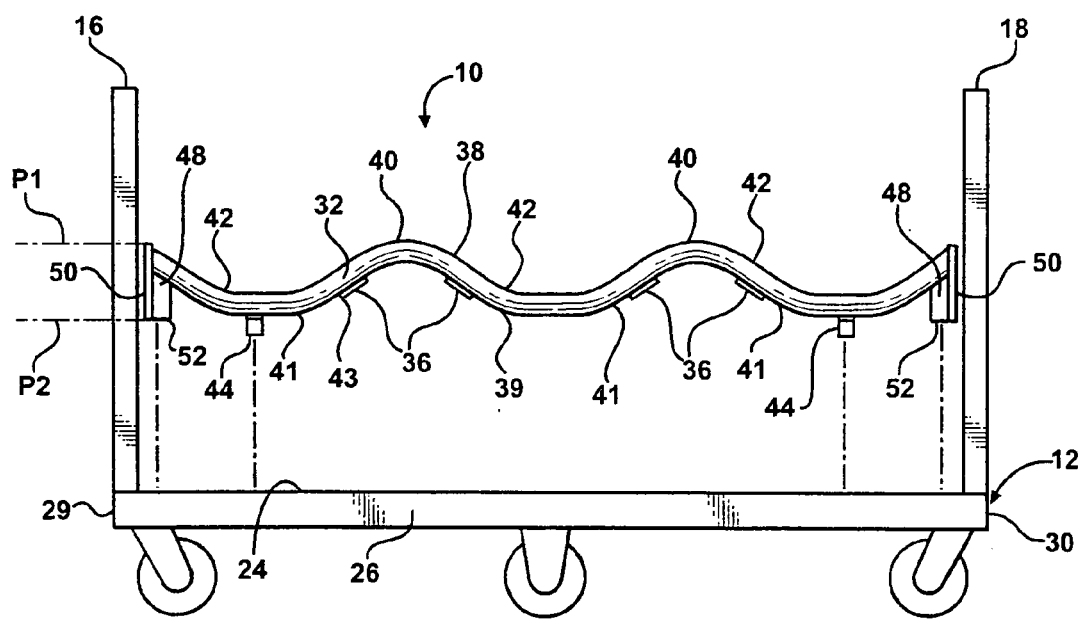
FIG. 3 is a side elevation view of the cart with the cradle assembly raised therefrom.
Figure 4:
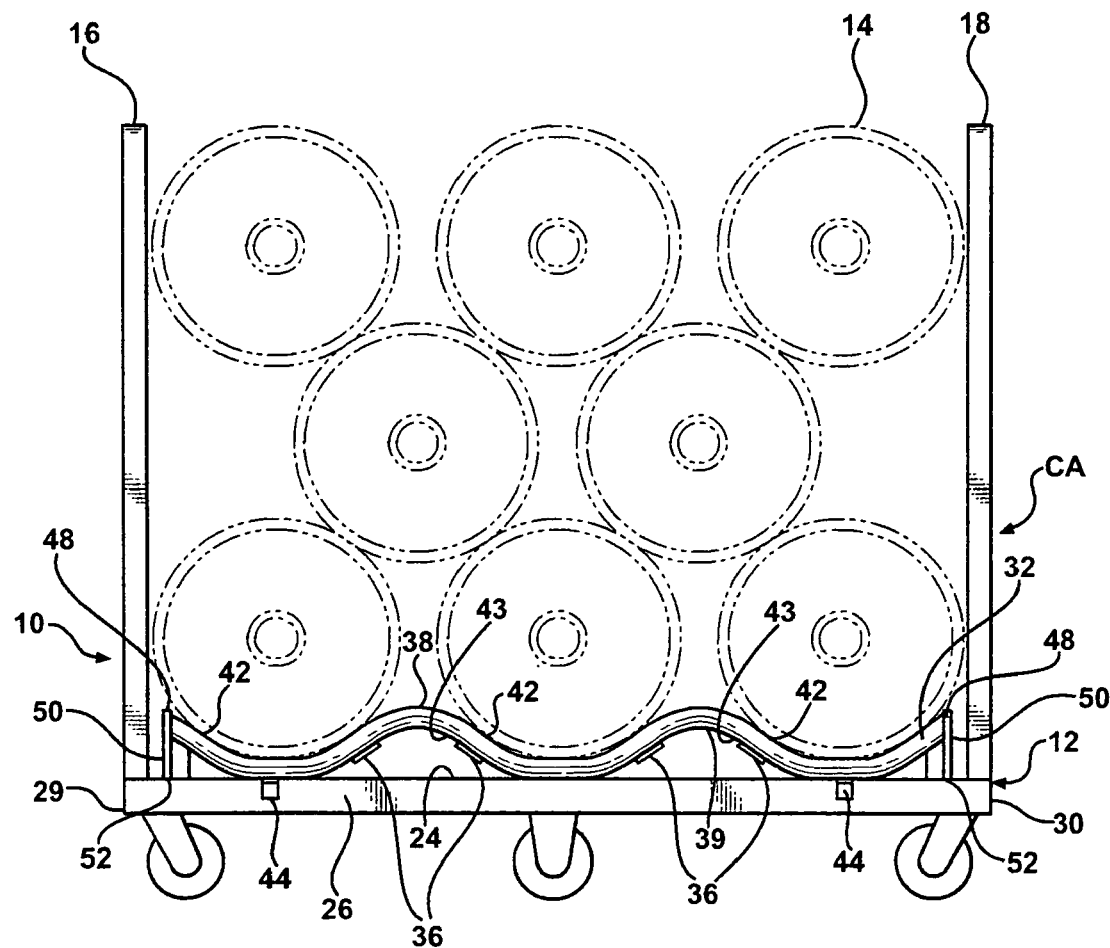
FIG. 4 is a side elevation view of the cart with a single cradle assembly supporting a plurality of containers on the cart.

As shown in FIGS. 1, 3 and 4, the cart 12 is represented here, by way of example and without limitations, as a six-wheeled hand propelled push cart, though it should be recognized that a cart having more or fewer wheels could be used in conjunction with the cradle assembly 10, or a convertible hand truck could also be used (not shown), all readily available from Magline, Inc., of Pinconning, Mich. The cart 12 has a generally horizontal transport surface or platform 24 with laterally spaced sides 26, 27 extending between opposite front and rear ends 29, 30. The platform 24 typically comes in standard widths of 12, 16 and 18 inches, though it is contemplated that the cradle assembly could be constructed to accommodate any cart width, as desired. The upstanding handle 16 or pair of handles 16, 18 generally extend from the platform 24 generally adjacent the opposite ends 29, 30 to facilitate pushing the cart 12.

The cradle assembly 10 has a pair of support rails 32, 34 spaced laterally from one another and operably connected and maintained in a generally parallel, fixed relation to one another by at least one, and, preferably, a plurality of cross bars 36. The support rails 32, 34 are preferably constructed from a tubular metallic material, for example, steel or aluminum piping, which is typically extruded to provide a relatively economical, lightweight, and strong assembly. Other materials, such as high strength plastics, for example, could be used, as well as non-tubular constructions, if desired.

Preferably, prior to joining the support rails 32, 34 to one another via the cross bars 36, the support rails 32, 34 are formed, such as in a bending process, for example, whereupon upper and lower surfaces 38, 39 of the support rails 32, 34 are formed to take a generally curvilinear, sinuous shape over at least a substantial portion of their length. Upon being bent, the support rails 32, 34 are arranged in a laterally spaced, mirrored relation to one another, with a portion of the upper and lower surfaces 38, 39 transitioning between upper and lower peaks or lobes 40, 41. As shown in FIG. 3, when in their mirrored relation, the uppermost surface of the lobes 40 preferably define a first imaginary tangential plane P1 and the uppermost surface of the lower lobes 41 preferably define a second imaginary tangential plane P2, with the first and second planes P1, P2 being generally vertically parallel to one another.

With the support rails 32, 34 arranged in mirrored relation to one another, the cross bars 36 are attached to the support rails 32, 34, such as through a weld joint or fasteners, in a laterally spaced relation to one another to maintain the support rails 32, 34 in a rigid, fixed relation. The cross bars 36 are represented here as being attached to the lower surfaces 39 of the support rails 32, 34 between the first and second planes P1, P2 to provide maximum rigidity to the assembly 10 in torsion, and to prevent interference between the cross rails 36 and the platform 24 of the cart 12.

Figure 5:
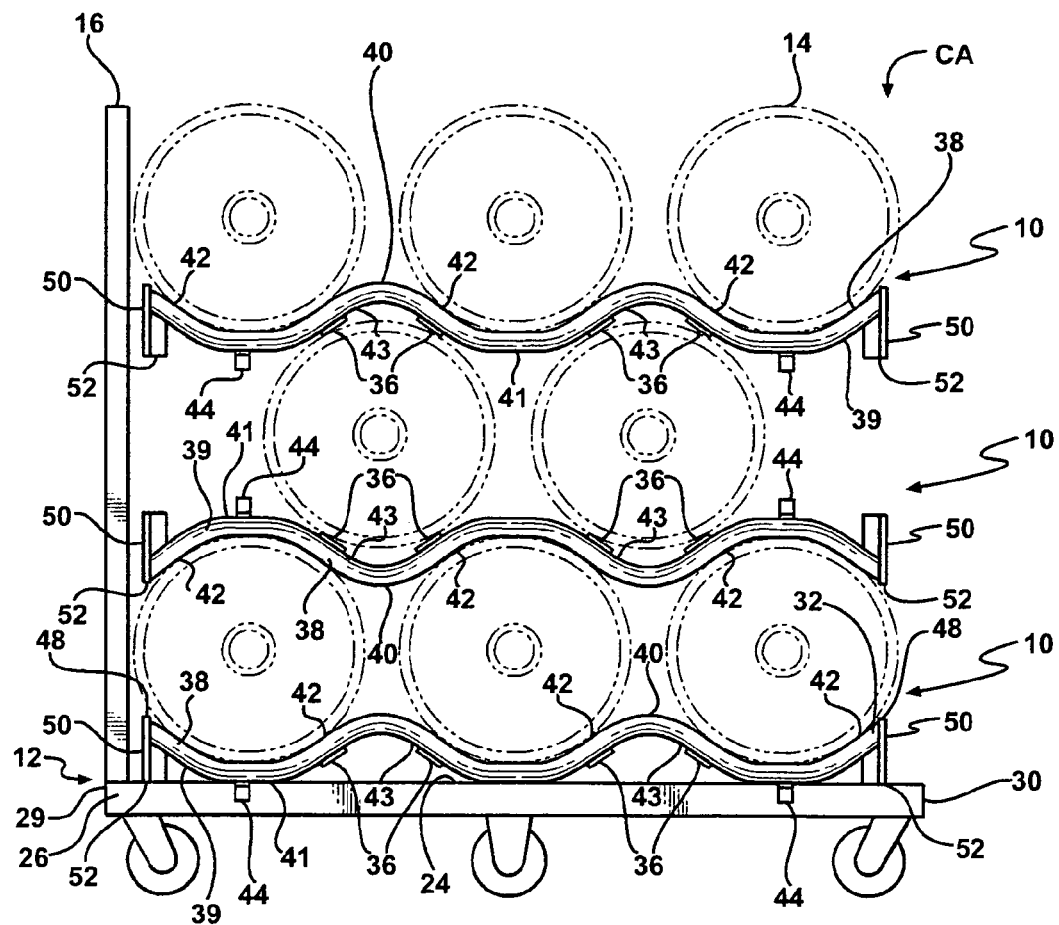
FIG. 5 is a side elevation view of a cart having a single upstanding handle at one end of the cart with multiple cradle assemblies supporting a plurality of containers on the cart.

The upper and lower surfaces 38, 39 define a plurality of pairs of laterally opposed upper and lower lobular support surfaces 42, 43, respectively, and represented here, by way of example and without limitations, as three upper support surfaces 42 and two lower support surfaces 43. The upper and lower support surfaces 42, 43 preferably lie along generally arcuate longitudinal paths, and are sized to support the containers 14 against movement along the length of the cart 12. In the preferred construction, the upper and lower support surfaces 42, 43 are constructed having generally the same curvilinear lobular form having a slightly larger radius than the containers 12. The upper and lower support surfaces 42, 43 are spaced laterally along the length of the support rails 32, 34 to maintain the containers 14 in generally close proximity to one another. The lower support surface 43 of the middle cradle assembly in FIG. 5 is shown here as being defined in part by the cross rails 36, though the cross rails 36 could be positioned so as to avoid contacting the containers 14 during transport. It should be recognized that the upper and lower support surfaces 42, 43 could be spaced further from one another, or they may be constructed having stepped, generally linear sections, rather than being curvilinear, if desired.

Figure 2:
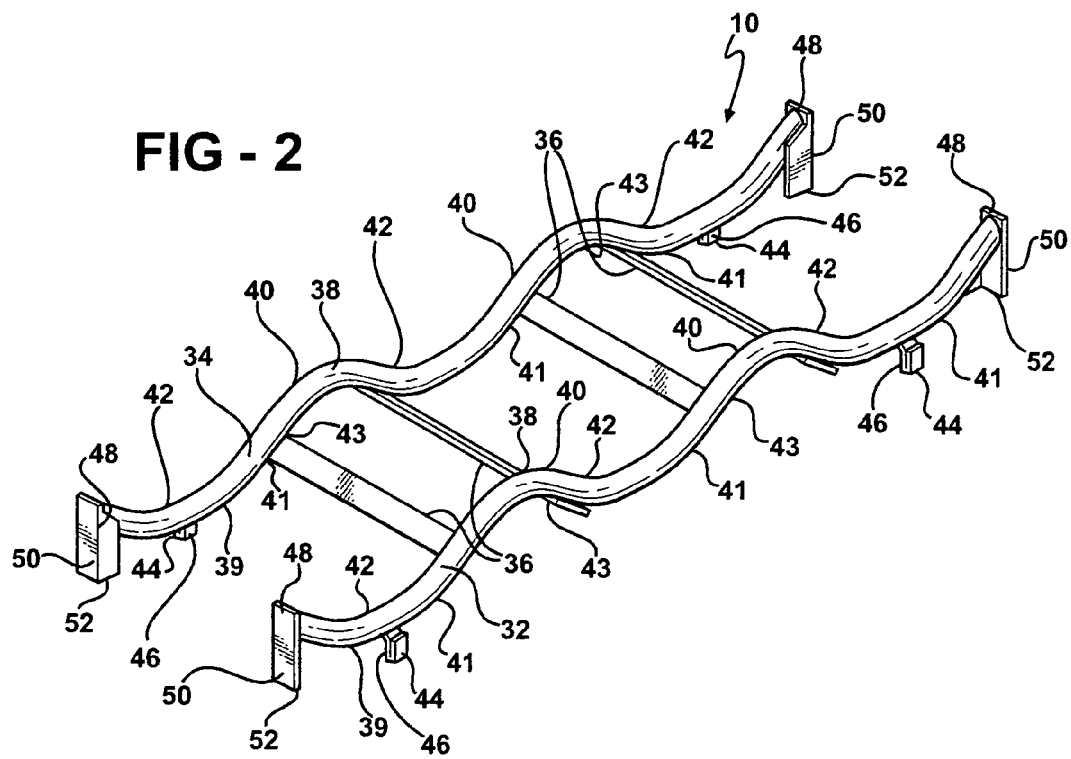
FIG. 2 is a perspective view of the cradle assembly of FIG. 1.

To facilitate maintaining the overall cradle assemblage CA in releasably secured relation to the cart 12, at least one locating and retention member 44 extends from each of the support rails 32, 34 of the lower cradle assembly 10 for engagement with the sides 26, 27 of the platform 24. The locating members 44 are constructed here, by way of example and without limitations, as generally L-shaped brackets or fingers. The locating members 44 are attached, such as by a weld joint or fastener, for example, to the lower surfaces 39 of the support rails 32, 34 of the cradles. The locating members 44 are preferably arranged opposite one another, with inner surfaces 46 (FIG. 2) extending downwardly from the support rails 32, 34 to overlie the sides 26, 27 of the cart platform 24 in closely spaced abutting relation thereto to provide secure receipt of the cradle assembly, and to prevent lateral movement of the cradle assembly 10 relative to the platform while in use. The locating members 44, though preventing lateral movement of the cradle assembly, allow the cradle assembly 10 to be lifted upwardly from the platform 24 to facilitate easy removal of the cradle assembly 10 from the cart 12.

Preferably, each support rail 32, 34 has a pair of end supports or legs 48 attached at their ends, such as, for example, through a weld joint or fasteners. The end supports 48 have end faces 50 positioned for a relatively close fit between the hand rails 16, 18 of the cart 12. The cradle assembly 10 may, however, be easily set on the cart (FIG. 3) to transport the containers 14, and lifted from the platform 24 and removed to facilitate transporting non-cylindrical packages. The end supports 48 have flat bottom surfaces 52 arranged for supporting engagement with the platform 24 of the cart 12.

As shown in FIG. 4, when in use with a cart 12 having opposite hand rails 16, 18, the cradle assembly 10 is placed on the platform 24 between the handles 16, 18 so that the lower lobular surfaces 39 of the support rails 32, 34 defining the second plane P2 preferably engage the platform 24 along with the bottom surfaces 52 of the end supports 48. The opposing locating members 44 overlie the sides 26, 27, as discussed above, to prevent lateral shifting of the cradle assembly 10 while in use. With the cradle assembly 10 positioned on the cart 12, a first row of containers 14 is placed in engagement with the respective upper support surfaces 42. A second row, represented here as a pair of containers 14, is then stacked on top of the first underlying row in a pyramidal configuration. Next, a third row of containers 14 is stacked on top of the second underlying row, such that the third row preferably has the same number of containers 14 as in the first row.

As shown in FIG. 5, when in use with a cart 12 having a single hand rail 16, a first cradle assembly 10 is placed on the platform 24. One pair of end supports 48 is positioned adjacent the hand rail 16, with the other pair of end supports 48 facing the other end of the cart 12, with the bottom surfaces 52 of the end supports 48 and the lower surfaces 39 of the support rails 32, 34 defining the second plane P2 engaging the platform 24. The positioning members 44 overlie the exterior sides 26, 27, as discussed above. A first row of containers 14 is first placed on the lowermost cradle assembly 10 so that the containers 14 are in engagement with the upper support surfaces 42, as described above. To facilitate transporting the maximum number of containers 14 on the cart 12, a second cradle assembly 10 is inversely placed or vertically reversed upon the first row of containers 14 so that the formerly upper support surfaces 42 of the second cradle assembly 10 are in abutment with upwardly facing surfaces of the first row of containers 14. Accordingly, the first and second cradle assemblies 10 are in vertically spaced, mirrored relation. Additional containers, represented here, for example, as two containers 14, are disposed in engagement with the upwardly facing formerly lower support surfaces 43 of the second cradle assembly 10 to form a second row of containers 14 in a staggered pyramidal configuration relative to the first row of containers 14. To further facilitate transporting the maximum number of containers 14 on the cart 12, a third cradle assembly 10 is placed upon the second row of containers 14 so that the lobular lower support surfaces 43 of the third cradle assembly 10 are supported on the upwardly facing surfaces of the second row of containers 14. Accordingly, the second and third cradle assemblies 10 are in vertically spaced, mirrored relation. Additional containers, represented here, for example, as three containers 14, are place in engagement with the upper support surfaces 42 of the third cradle assembly 10 to create a third row of containers 14 in a staggered configuration relative to the second row of containers 14. Preferably, the third row of containers 14 is initiated by stacking a centrally located container, represented here as the middle container 14, on the third cradle assembly 10 so that the cradle assembly 10 does not tip relative to the second row of containers 14. Thereafter, the remaining containers 14 are stacked on the remaining lobular upper support surfaces 42, and the maximum number of containers 14 is secured for transport on the cart 12. It should be recognized that the rows of containers 14 are preferably removed from the third cradle assembly 10 in the reverse order from which they were stacked, thereby ensuring that the third cradle assembly 10 does not tip relative to the second row of containers 14.

It should be recognized that upon reading the disclosure herein, that one ordinarily skilled in the art of would readily recognize other embodiments than those disclosed herein, with those embodiments being within the spirit and scope of the invention. Accordingly, the disclosure herein is intended to be exemplary, and not limiting. The scope of the invention is defined by the following claims.

We claim:

1. A vertically reversible cradle assembly for use with a wheel supported push cart having a transport surface to facilitate transporting multiple cylindrical containers, comprising:
    a pair of support rails, each of said support rails having a generally sinuous upper surface and a generally sinuous lower surface; and
    at least one cross bar attached to said support rails to maintain said sinuous upper surfaces of each support rail in laterally spaced mirrored relation with one another to define laterally opposed pairs of laterally spaced upper support surfaces to carry said containers in a stabilized position, said sinuous lower surfaces being maintained in mirrored relation with one another to define pairs of laterally spaced lower support surfaces adapted to engage said cart transport surface, and said upper support surfaces being offset from said lower support surfaces alone the length of the support rails.

2. The cradle assembly of claim 1 wherein said support rails are constructed from bent metal tubing.

3. The cradle assembly of claim 1 further comprising at least one retention and positioning member extending from each of said support rails to facilitate the releasable attachment of said cradle assembly to the push cart.

4. The cradle assembly of claim 1 wherein a portion of said sinuous upper surface defines a first tangential imaginary plane and a portion of said sinuous lower surface defines a second tangential imaginary plane generally vertically parallel to said first imaginary plane, said at least one cross bar being attached to said support rails between said first and second imaginary planes.

5. A plurality of cradle assemblies in combination with a push cart having a platform to facilitate transporting multiple, vertically supported rows of generally cylindrical containers on the push cart, separate cradle assemblies being placeable in vertically spaced relation between adjacent rows of the containers, each of said cradle assemblies, comprising:
    a pair of support rails, each of said support rails having a generally sinuous upper surface and a generally sinuous lower surface; and
    at least one cross bar operably connecting said support rails in generally parallel relation with one another to maintain said sinuous upper surfaces in mirrored relation to define pairs of laterally spaced upper support surfaces for a row of said containers to form a first row of containers, said sinuous lower surfaces being maintained in mirrored relation with one another to define pairs of laterally spaced lobular lower support surfaces for either supporting one of said cradle assemblies on said platform of the push cart or on a lower row of containers.

6. The cradle assemblies of claim 5 wherein the upper support surfaces and the lower support surfaces of each cradle assembly carry the containers in adjacent vertically stacked rows in an offset relation relative to one another.

7. A method of assembling and supporting generally cylindrical containers on a wheeled cart having a platform, comprising:
    providing a plurality of cradle assemblies, each of said cradle assemblies having a pair of support rails with a generally sinuous upper surface and a generally sinuous lower surface with at least one cross bar attached to said support rails to maintain said support rails in generally mirrored relation with one another to define pairs of laterally spaced upper support surfaces and laterally spaced lower support surfaces;
    placing a first cradle assembly on said cart with said lower support surface of said first cradle assembly engaging said platform of said cart;
    placing a corresponding number of containers on said upper support surfaces of said first cradle assembly to form a first row of containers;
    placing a second vertically reversed cradle assembly upon the first row of containers with said formerly upper support surface of said second cradle assembly abutting the first row of containers; and
    placing a corresponding number of containers in abutment with said formerly lower support surfaces of said second cradle assembly to form a second row of containers so that said second cradle assembly is sandwiched between said first and second rows of containers.

8. The method of claim 7 including placing a third cradle assembly over the second row of containers with said lower support surface of said third cradle assembly supported on the second row of containers and placing a corresponding number of containers upon said upper support surfaces of said third cradle assembly to form a third row of containers.

9. The method of claim 8 including disposing the second row of containers in a staggered relation to the first and third rows of containers.

10. A vertically reversible cradle assembly for use with a cart to facilitate transporting multiple containers, comprising:

a pair of support rails each having an upper surface defining a plurality of upper support surfaces and a lower surface defining a plurality of lower support surfaces offset from the upper support surfaces along the length of the support rails; and at least one cross bar attached to said support rails to maintain the upper support surfaces of one support rail aligned with the upper support surfaces of the other support rail and the lower support surfaces of one support rail aligned with the lower support surfaces of the other rail.

11. The cradle assembly of claim 10 wherein on the upper surface of a support rail a peak is defined between and separating adjacent upper support surfaces and opposite the peak, on the lower surface of the support rail, at least part of a lower support surface is defined.

* * * * *